United States Patent
Hannon

(12)
(10) Patent No.: US 6,203,872 B1
(45) Date of Patent: Mar. 20, 2001

(54) WATERPROOF AND WATER VAPOUR PERMEABLE LINING

(75) Inventor: Dennis W Hannon, Newburyport, MA (US)

(73) Assignee: Akzo Nobel NV, Arnhem (NL)

( * ) Notice: Subject to any disclaimer, the term of this patent is extended or adjusted under 35 U.S.C. 154(b) by 0 days.

(21) Appl. No.: 09/121,051

(22) Filed: Jul. 23, 1998

(51) Int. Cl.$^7$ .................................................. B32B 1/08
(52) U.S. Cl. .................. 428/36.6; 428/315.5; 428/474.4; 428/480; 528/70; 528/272; 528/288; 528/297; 528/292; 528/310; 528/323; 528/328; 528/326; 524/104; 524/505; 524/608; 525/408; 525/423; 525/430; 525/437
(58) Field of Search ............................... 428/36.6, 315.5, 428/474.4, 480; 528/70, 272, 288, 297, 292, 310, 323, 328, 326; 524/104, 505, 608; 525/400, 423, 430, 437

(56) References Cited

U.S. PATENT DOCUMENTS

| | | | |
|---|---|---|---|
| 4,493,870 | 1/1985 | Vrouenraets et al. | 442/236 |
| 5,208,313 | 5/1993 | Krishnan | 528/28 |
| 5,238,732 | 8/1993 | Krishnan | 442/76 |
| 5,239,037 | 8/1993 | Krishnan | 528/28 |
| 5,253,434 | 10/1993 | Curley, Jr. et al. | 36/55 |
| 5,562,977 * | 10/1996 | Jager | 442/184 |
| 5,744,570 * | 4/1998 | Gebben | 528/170 |

FOREIGN PATENT DOCUMENTS

| | | |
|---|---|---|
| 677 584 A5 | 6/1991 | (CH) . |
| 2529670 | 3/1975 | (DE) . |
| 0 410 291 A2 | 1/1991 | (EP) . |
| 0 665 259 A1 | 8/1995 | (EP) . |
| 1172085 * | 11/1969 | (GB) . |
| 72-16874 | 5/1972 | (JP) . |
| 57-205586 | 12/1982 | (JP) . |
| 59-30957 | 2/1984 | (JP) . |
| 59-216983 | 12/1984 | (JP) . |
| 1-192866 | 8/1989 | (JP) . |
| WO 91/07278 | 5/1991 | (WO) . |
| WO91/07278 * | 5/1991 | (WO) . |
| WO 91/09166 | 6/1991 | (WO) . |
| WO91/09166 * | 6/1991 | (WO) . |
| WO 92/05308 | 4/1992 | (WO) . |

* cited by examiner

Primary Examiner—Leszek Kiliman
(74) Attorney, Agent, or Firm—Oliff & Berridge, PLC

(57) ABSTRACT

Proposed is a process for sealing the seams of a water vapour permeable lining comprising a laminate of a textile material and a waterproof, but water vapour permeable film in which sections of said laminate with the textile sides facing one another are bonded together along the contours of the material to be lined, after which the lining is dipped in a solution of a hydrophilic polymer in an organic solvent which acts as a swelling agent for the waterproof film of the laminate, followed by evaporation of the solvent.

The water vapour permeable film in the laminate preferably is made of a hydrophilic copolyetherester or copolyetheramide, while the hydrophilic polymer soluble in an organic solvent preferably is a copolyetherester.

14 Claims, No Drawings

WATERPROOF AND WATER VAPOUR PERMEABLE LINING

The invention pertains to a process for sealing the seams of a water vapour permeable lining comprising a laminate of a textile material and a waterproof, but water vapour permeable film in which sections of said laminate with the textile sides facing each other are bonded together following the contours of the material to be lined.

Such a process is known from EP-A-410 291. According to the process described in said document, first a laminate is produced by bonding a textile material and a water vapour permeable film together using a waterproof, but water vapour permeable adhesive applied across the entire surface area, after which sections of this laminate with the textile sides facing each other are heated following the contours of the material to be lined, so that the adhesive will melt in situ and/or is activated, and after cooling a lining with wholly waterproof seams is obtained.

A drawback to the process described in this document is that a thermoplastic polyetherurethane is selected as the adhesive. A significant disadvantage of polyurethanes is constituted by the high toxicity of the polyisocyanates employed in their preparation and the long periods required for the adhesive to complete its reaction process.

The Invention now provides a process which obviates the drawback to the known process wholly or for the most part.

The invention consists in that in a process of the known type mentioned in the opening paragraph the lining is dipped in a solution of a hydrophilic polymer in an organic solvent which acts as a swelling agent for the waterproof film of the laminate, followed by evaporation of the solvent.

A major advantage achieved when using the process according to the invention is that the lining is ready for use immediately after evaporation of the solvent and can be processed without delay.

It is not necessary to treat the entire lining with a solution of a hydrophilic polymer. Preferably, only the section of the lining with the waterproof film turned inside out where the seams are is subjected to a dipping treatment.

The linings of which the seams can be waterproofed by the process according to the invention are used not only in the textile industry but also in the furniture and car industries. However, the advantages are especially evident in the case of use in the clothing industry in the manufacture of waterproof, but water vapour permeable gloves, garments or shoes.

It has been found that, as a rule, very favourable results are obtained when a) for the water vapour permeable, but waterproof film in the laminate use is made of a copolyetherester consisting of a plurality of recurrent intralinear long-chain ester units and short-chain ester units randomly joined head to tail through ester bonds, the long-chain ester units corresponding to the formula

and the short-chain ester units corresponding to the formula:

wherein G is a divalent radical remaining after the removal of terminal hydroxyl groups from at least one long-chain glycol having an average molecular weight in the range of 600 to 4000 and an atomic ratio of carbon to oxygen in the range of 2.0 to 4.3, at least 20 wt %. of the long-chain glycol having a carbon to oxygen ratio in the range of 2.0 to 2.4, and 15 to 50 wt %. being part of the copolyetherester, R is a divalent radical remaining after the removal of carboxyl groups from at least one dicarboxylic acid having a molecular weight of less than 300, and D is a divalent radical remaining after the removal of hydroxyl groups from at least one diol having a molecular weight of less than 250, with at least 70 mole % of the dicarboxylic acid employed being either terephthalic acid or 2,6-naphthalene dicarboxylic acid or its ester forming equivalents and at least 70 mole % of the low-molecular weight diol consisting of 1,4-butane diol or its ester forming equivalents, with the sum of the mole percentage of dicarboxylic acid which is neither terephthalic acid nor 2,6-naphthalene dicarboxylic acid or its ester forming equivalents and the mole percentage of low-molecular weight dial which is not 1,4-butane diol or its ester forming equivalents being not more than 30, and the short-chain ester units making up 25–75 wt %. of the copolyetherester, b) the hydrophilic polymer which after evaporation of the solvent forms a waterproof, but water vapour permeable coating is made up of a copolyetherester of a similar type and composition as listed under a), with the proviso that preference is given to a polymer of which the melting point is at least 5° C. and at most 35° C. lower than that of the copolyetherester of which the waterproof film in the laminate is made, and c) the organic solvent is selected from the group of halogenated hydrocarbons.

Copolyetheresters with a reduced melting point can be obtained, int. al., by the incorporation into the short-chain ester units of a dicarboxylic acid other than terephthatic acid or naphthalene dicarboxylic acid having a molecular weight of less than 300 or some other dial having a molecular weight of less than 250. Examples of dicarboxylic acids suitable for use are isophthalic acid and adipic acid. As an example of an alternative low-molecular weight diol to 1,4-butane diol may be mentioned ethylene glycol.

The halogenated solvents which are preferred according to the present invention can contain fluorine as well as chlorine, bromine or iodine. Since preference is given to solvents with a low boiling point, fluorine- and chlorine-containing solvents are especially eligible for use.

So far, optimum results have been obtained with the organic solvent used being a chlorinated organic solvent belonging to the group of methylene chloride, chloroform, dichloroethane, trichloroethane, and tetrachloroethane.

Examples of copolyetheresters suitable for use according to the present invention have been described, int. al., in U.S. Pat. No. 4,493,870 and U.S. Pat. No. 5,562,977.

Favourable results can also be obtained when the water vapour permeable, but waterproof film in the laminate is formed by a copolyetheramide composed of polyamide segments A and ethylene oxide groups-containing polyamide segments B, with the polyamide segments A comprising monomer units of the structure:

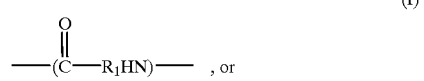

-continued

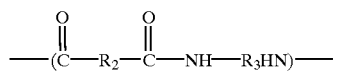
(II)

wherein $R_1$ stands for an alkylene group having 3 to 11 carbon atoms which may be substituted or not and $R_2$ and $R_3$ may be the same or different and stand for a (cyclo)alkylene group having 4 to 11 carbon atoms which may be substituted or not or a difunctional aromatic group, and the polyamide segments B comprising monomer units of the structure:

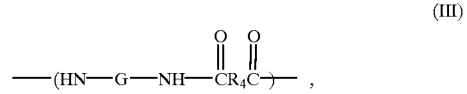
(III)

wherein G stands for a divalent group remaining after the removal of the amino terminated groups of a polyoxyalkylene diamine which is connected or not via one or more lactam units included among the polyamide segments A according to the former formula with a dicarboxylic acid unit wherein $R_4$ has the meaning of a (cyclo)alkylene group which may be substituted or not, a polyoxyalkylene group or a difunctional aromatic group, with α) at least 10 and at most 30 wt %. of the copolyetheramide being made up of ethylene oxide groups, β) 30 to 60 wt %. of the copolyetheramide being made up of polyamide segments A and 70 to 40 wt %. being made up of polyamide segments B containing the monomer units according to formula (III), wherein G stands for a polyoxyalkylene group having a molecular weight of 600 to 6000 and an atomic ratio of carbon to oxygen of 2.0 to 4.3, or when the group $R_4$ stands for a divalent group obtained after removal of the carboxyl groups, for a dimeric fatty acid or for a polyoxyalkylene group having a molecular weight of 600 to 6000 and an atomic ratio of carbon to oxygen of 2.0 to 4.3, as well as for a (cyclo)alkylene group having 2 to 12 carbon atoms which may be substituted or not or for a difunctional aromatic group, and γ) the copolyetheramide having a melting point in the range of 180 to 260° C.

Examples of copolyetheramides suitable for use according to the present invention have been described, int. al., in U.S. Pat. No. 5,744,570.

When a copolyetheramide film is used for the water vapour permeable, but waterproof film in the laminate, favourable results can also be obtained when the selected hydrophilic polymer which after evaporation of the solvent forms a waterproof, but water vapour permeable coating is a copolyetherester of a similar type and composition as indicated above for use as a coating for a hydrophilic copolyetherester film. Also in order to achieve enhanced solubility, preference is again given to a copolyetherester which in the short-chain ester units incorporate a comonomer of low molecular weight. Examples of such comonomers are isophthalic acid, adipic acid, and ethylene glycol. The amount to be incorporated generally corresponds to 5 to 30 mole % of the overall amount of diacid or diol present.

The invention will be further elucidated with reference to the following examples, Needless to say, the scope of the invention is not restricted to the specific details of the examples.

EXAMPLE I

Into a 200 l autoclave were charged 25.95 kg of dimethyl terephthalate, 21.6 kg of 1,4-butane diol, and 12.5 kg of polyethylene oxide glycol having an average molecular weight of 4000. The reaction mixture was heated, with stirring, to 110° C., after which 500 ppm of tetrabutyl titanate (calculated on dimethyl terephthalate) were added. Upon a further increase in temperature to 160° C. methanol distilled off, whereupon the pressure was slowly reduced to 100 Pa and the temperature increased to 245° C. In the course of this 3- to 4-hour long polycondensation reaction a product was obtained which had a relative viscosity of 2.76 (determined at a concentration of 1.0 g in 100 g m-cresol at 25° C.).

The copolyetherester was subjected to a post-condensation in the solid phase until a relative viscosity in the range of 3.5 to 4 was achieved and blow-moulded into a film having a thickness of about 15 μm, followed by lamination with a woven fabric of polyamide 6. Out of the resulting laminate the front and back of a glove were cut. The two parts were sewn together along the edges with the textile sides facing each other to form a three-dimensional lining.

EXAMPLE II

In a manner analogous to that indicated in Example I a copolyetherester was prepared starting from 24.1 kg of the dimethylester of 2,6-naphthalene dicarboxylic acid (DM-2,6-NDC), 13.3 kg of 1,4-butane diol, 12.0 kg of polyethylene oxide glycol having an average molecular weight of 2000, and 12.0 kg of polytetramethylene oxide glycol (pTHF) having an average molecular weight of 1000. The reaction was carried out in the presence of 24.1 g of tetrabutyl titanate and 0.25 kg of 1,3,5-trimethyl-2,4,6-tris[3,5-di-tertbutyl-4-hydroxybenzyl] as anti-oxidant and 250 g of $SiO_2$ (as suspension in 1,4-butane diol). The polymerisation temperature was 246° C. The product had a relative dissolving viscosity of 2.50 (determined at a concentration of 1.0 g in 100 g m-cresol at 25° C.). Post-condensation in the solid phase yielded a product having an $\eta_{rel}$=4.32.

The percentage by weight of short-chain ester units was 43.2, which corresponds to a percentage by weight of long-chain ester units of 56.8. This copolyetherester was cast to form a foil having a thickness of 13.5 μm, which was then laminated with a woven fabric of polyamide-6.

EXAMPLE III

In a manner analogous to that indicated in Example I, making use of 465 kg of dimethyl terephthalate, 82 kg of dimethyl isophthalate, 490 kg of polytetra-hydrofuran having a molecular weight of 1000, and 350 kg of polyethylene oxide glycol having a molecular weight of 2000, a copolyetherester was prepared which contained 33.8 wt %. of short-chain ester units.

The thus prepared copolyetherester was processed into an 8 wt %. solution in methylene chloride.

EXAMPLE IV

With the fingers pointing down, the lining made in Example I, with the copolyetherester film turned outward, was dipped three times for 15 seconds each in the methylene chloride solution of Example III. In the intermediate periods of 45 seconds each evaporation of the solvent took place. During this evaporation process proceeding at room temperature the lining was turned 180°, such that on conclusion of the evaporation process the fingers were pointing upwards. Afterwards, the lining was filled completely with water to check its impermeability to water. If there was no leakage after 10 minutes, the lining was characterised as waterproof.

The waterproofness of the lining was amply sufficient.

What is claimed is:

1. A method of sealing seams of a waterproof, water vapor permeable article comprising a waterproof, water vapor permeable film and having seams, the method comprising
    contacting a surface of the article at least at the seams of the film with a coating solution containing a hydrophilic polymer in an organic solvent which acts as a swelling agent for the waterproof, water vapor permeable film, and
    evaporating the organic solvent to form a waterproof, water vapor permeable coating comprised of the hydrophilic polymer.

2. A method according to claim 1, wherein the contacting comprises dipping the film into the coating solution.

3. A method according to claim 1, wherein the contacting contacts substantially an entire surface of the film with the coating solution.

4. A method according to claim 1, wherein the article is a lining comprising a laminate of the waterproof, water vapor permeable film and a textile material.

5. A method according to claim 4, wherein the method further comprises, prior to the contacting step, joining together along contours of a material to be lined one or more sections of the lining in which textile sides of the lining are facing one another.

6. A method according to claim 4, wherein the seams of the lining are formed towards an inside portion of the lining, and the contacting comprises turning the lining inside out to expose the portion of the lining where the seams are, and dipping this portion into the coating solution.

7. A method according to claim 1, wherein
    a) the waterproof, water vapor permeable film comprises a copolyetherester comprising a plurality of recurrent intralinear long-chain ester units and short-chain ester units randomly joined head to tail through ester bonds, the long-chain ester units corresponding to the formula:

and the short-chain ester units corresponding to the formula:

wherein
        G is a divalent radical remaining after the removal of terminal hydroxyl groups from at least one long-chain glycol having an average molecular weight in the range of 600 to 4,000 and an atomic ratio of carbon to oxygen in the range of 2.0 to 4.3, at least 20 wt. % of the long-chain glycol having a carbon to oxygen ratio in the range of 2.0 to 2.4, and 15 to 50 wt. % being part of the copolyetherester,
        R is a divalent radical remaining after the removal of carboxyl groups from at least one dicarboxylic acid having a molecular weight of less than 300, at least 70 mole % of the dicarboxylic acid comprising either terephthalic acid or 2,6-naphthalene dicarboxylic acid or its ester forming equivalents, and
        D is a divalent radical remaining after the removal of hydroxyl groups from at least one low molecular weight diol having a molecular weight of less than 250, at least 70 mole % of the low-molecular weight diol comprising 1,4-butane diol or its ester forming equivalents,
    with the sum of (1) the mole percentage of dicarboxylic acid which is not terephthalic acid or 2,6-naphthalene dicarboxylic acid or its ester forming equivalents and (2) the mole percentage of the low-molecular weight diol which is not 1,4-butane diol or its ester forming equivalents being not more than 30,
    and the short-chain ester units making up 25 to 75 wt. % of the copolyetherester,
    b) the hydrophilic polymer comprises a copolyetherester of a similar composition as listed under a), and
    c) the organic solvent comprises one or more halogenated hydrocarbons.

8. A method according to claim 7, wherein the melting point of the copolyetherester of the waterproof, water vapor permeable coating is at least 5° C. and at most 35° C. lower than the melting point of the copolyetherester of the waterproof, water vapor permeable film.

9. A method according to claim 1, wherein the organic solvent is a chlorinated organic solvent selected from the group consisting of methylene chloride, chloroform, dichloroethane, trichlororethane and tetrachloroethane.

10. A method according to claim 1, wherein
    a) the waterproof, water vapor permeable film comprises a copolyetheramide comprised of polyamide segments A and ethylene oxide group-containing polyamide segments B, wherein the polyamide segments A comprise monomer units of the structure:

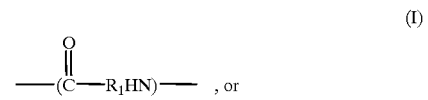

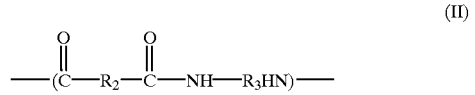

wherein
        $R_1$ represents an alkylene group having 3 to 11 carbon atoms which may be substituted or not and
        $R_2$ and $R_3$ may be the same or different and represent a (cyclo)alkylene group having 4 to 11 carbon atoms which may be substituted or not, or a difunctional aromatic group,
    and the polyamide segments B comprise monomer units of the structure:

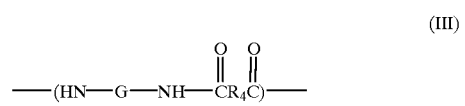

wherein
        G is a divalent group remaining after the removal of amino terminated groups of a polyoxyalkylene diamine which is connected or not via one or more lactam units included among the polyamide segments A according to formula (I) or formula (II) with a dicarboxylic acid unit and
        $R_4$ represents a (cyclo)alkylene group which may be substituted or not, a polyoxyalkylene group or a difunctional aromatic group, and wherein a) at least 10 mole % and at most 30 mole % of the copolyetheramide is made up of ethylene oxide groups, b) 30 wt. % to 60 wt. % of the copolyetheramide is made up of polyamide segments A and 70 wt. % to 40 wt. % is made up of polyamide segments B, wherein G is a polyoxyalkylene group having a molecular weight of 600 to 6,000 and an atomic ratio of carbon to oxygen of 2.0 to 4.3 or, when the group $R_4$ represents a divalent group obtained after the removal of the carboxyl groups, is a dimeric fatty acid or a polyoxyalkylene group having a molecular weight of 600 to 6,000 and an atomic ratio of carbon to oxygen of 2.0 to 4.3, or is a (cyclo)alkylene group having 2 to 12 carbon atoms which may be substituted or not or for a difunctional aromatic group, and c) the copolyetheramide has a melting point in the range of 180° C. to 260° C.

11. A waterproof, water vapor permeable article comprising a waterproof, water vapor permeable film having seams and comprised of at least a waterproof, water vapor permeable film and a waterproof, water vapor permeable hydrophilic polymer coating upon the waterproof, water vapor permeable film over at least the seams of the film, the article being produced by a method comprising:

contacting a surface of the film at least at the seams of the film with a coating solution containing a hydrophilic polymer in an organic solvent which acts as a swelling agent for the waterproof, water vapor permeable film, and evaporating the organic solvent to form the waterproof, water vapor permeable hydrophilic polymer coating.

12. A waterproof, water vapor permeable article according to claim 11, wherein a) the waterproof, water vapor permeable film comprises a copolyetherester comprising a plurality of recurrent intralinear long-chain ester units and short-chain ester units randomly joined head to tail through ester bonds, the long-chain ester units corresponding to the formula:

and the short-chain ester units corresponding to the formula:

wherein

G is a divalent radical remaining after the removal of terminal hydroxyl groups from at least one long-chain glycol having an average molecular weight in the range of 600 to 4,000 and an atomic ratio of carbon to oxygen in the range of 2.0 to 4.3, at least 20 wt. % of the long-chain glycol having a carbon to oxygen ratio in the range of 2.0 to 2.4, and 15 to 50 wt. % being part of the copolyetherester, R is a divalent radical remaining after the removal of carboxyl groups from at least one dicarboxylic acid having a molecular weight of less than 300, at least 70 mole % of the dicarboxylic acid comprising either terephthalic acid or 2,6-naphthalene dicarboxylic acid or its ester forming equivalents, and D is a divalent radical remaining after the removal of hydroxyl groups from at least one low molecular weight diol having a molecular weight of less than 250, at least 70 mole % of the low-molecular weight diol comprising 1,4-butane diol or its ester forming equivalents, with the sum of (1) the mole percentage of dicarboxylic acid which is not terephthalic acid or 2,6-naphthalene dicarboxylic acid or its ester forming equivalents and (2) the mole percentage of the low-molecular weight diol which is not 1,4-butane diol or its ester forming equivalents being not more than 30, and the short-chain ester units making up 25 to 75 wt. % of the copolyetherester, and b) the hydrophilic polymer comprises a copolyetherester of a similar composition as listed under a).

13. A waterproof, water vapor permeable article according to claim 11, wherein a) the waterproof, water vapor permeable film comprises a copolyetheramide comprised of polyamide segments A and ethylene oxide group-containing polyamide segments B, wherein the polyamide segments A comprise monomer units of the structure:

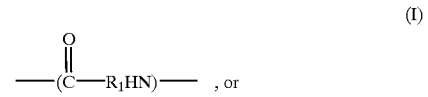

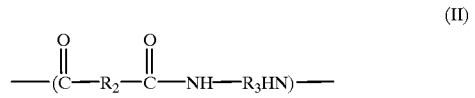

wherein $R_1$ represents an alkylene group having 3 to 11 carbon atoms which may be substituted or not and $R_2$ and $R_3$ may be the same or different and represent a (cyclo)alkylene group having 4 to 11 carbon atoms which may be substituted or not or a difunctional aromatic group, and the polyamide segments B comprise monomer units of the structure:

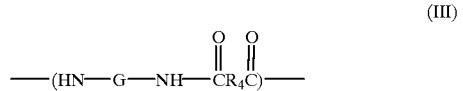

wherein

G is a divalent group remaining after the removal of amino terminated groups of a polyoxyalkylene diamine which is connected or not via one or more lactam units included among the polyamide segments A according to formula (I) or formula (II) with a dicarboxylic acid unit and $R_4$ represents a (cyclo)alkylene group which may be substituted or not, a polyoxyalkylene group or a difunctional aromatic group, and wherein a) at least 10 mole % and at most 30 mole % of the copolyetheramide is made up of ethylene oxide groups, b) 30 wt. % to 60 wt. % of the copolyetheramide is made up of polyamide segments A and 70 wt. % to 40 wt. % is made up of polyamide segments B, wherein G is a polyoxyalkylene group having a molecular weight of 600 to 6,000 and an atomic ratio of carbon to oxygen of 2.0 to 4.3 or, when the group $R_4$ represents a divalent group obtained after the removal of the carboxyl groups, is a dimeric fatty acid or a polyoxyalkylene group having a molecular weight of 600 to 6,000 and an atomic ratio of carbon to oxygen of 2.0 to 4.3, or is a (cyclo)alkylene group having 2 to 12 carbon atoms which may be substituted or not or for a difunctional aromatic group, and c) the copolyetheramide has a melting point in the range of 180° C. to 260° C.

14. A waterproof, water vapor permeable article according to claim 11, wherein the waterproof, water vapor permeable article is shaped as a glove, garment or shoe.

* * * * *

UNITED STATES PATENT AND TRADEMARK OFFICE
CERTIFICATE OF CORRECTION

PATENT NO. : 6,203,872 B1
DATED : March 20, 2001
INVENTOR(S) : Dennis W. Hannon

It is certified that error appears in the above-identified patent and that said Letters Patent is hereby corrected as shown below:

Column 1,
Line 25, change "Invention" to -- invention --.

Column 2,
Line 20, change "dial" to -- diol --;
Line 66, change "—(C—R₁HN)— ,or" to -- —(C—R₁HN)— , and/or --.

Signed and Sealed this

Thirtieth Day of April, 2002

Attest:

Attesting Officer

JAMES E. ROGAN
Director of the United States Patent and Trademark Office